United States Patent [19]
Bartlet et al.

[11] Patent Number: 5,100,605
[45] Date of Patent: Mar. 31, 1992

[54] PROCESS FOR THE PRODUCTION OF FINELY DIVIDED AND FREE-FLOWING POWDERS OF THERMOTROPIC POLYMERS

[75] Inventors: Philippe Bartlet, Villeurbanne; Philippe Moissonnier, Paris, both of France

[73] Assignee: Rhone-Poulenc Chimie, Courbevoie Cedex, France

[21] Appl. No.: 611,788

[22] Filed: Nov. 13, 1990

[30] Foreign Application Priority Data

Nov. 10, 1989 [FR] France ................. 89 15011

[51] Int. Cl.$^5$ .................................. B29C 47/86
[52] U.S. Cl. ........................... 264/143; 264/40.6
[58] Field of Search ............ 264/140, 141, 210.5, 264/143, 40.6

[56] References Cited

U.S. PATENT DOCUMENTS

| | | | |
|---|---|---|---|
| 3,585,259 | 6/1971 | Lefferis et al. ............... | 264/50 |
| 4,051,112 | 9/1977 | Kumtsuji et al. ............. | 264/141 |
| 4,216,253 | 8/1980 | Bonnebat et al. ............ | 264/40.6 |
| 4,325,903 | 4/1982 | Wissbrun et al. ............ | 264/176.1 |
| 4,332,759 | 6/1982 | Ide ............................... | 264/108 |
| 4,468,364 | 8/1984 | Ide ............................... | 264/211.12 |
| 4,581,443 | 4/1986 | Garg ............................ | 264/101 |
| 4,607,797 | 8/1986 | Enikolopon et al. ......... | 425/208 |
| 4,728,698 | 3/1988 | Isayru et al. ................. | 264/108 |
| 4,734,240 | 3/1988 | Chung et al. ................. | 264/210.5 |
| 4,769,200 | 9/1988 | Hupfer et al. ................ | 264/143 |
| 4,888,127 | 12/1989 | Wada et al. .................. | 252/299.5 |

FOREIGN PATENT DOCUMENTS

| | | |
|---|---|---|
| 1128120 | 4/1962 | Fed. Rep. of Germany . |
| 3332629 | 3/1985 | Fed. Rep. of Germany . |
| 2223427 | 10/1974 | France . |
| 2277121 | 1/1976 | France . |

*Primary Examiner*—Jay H. Woo
*Assistant Examiner*—Robert B. Davis
*Attorney, Agent, or Firm*—Burns, Doane, Swecker & Mathis

[57] ABSTRACT

Finely divided and free-flowing powders of a thermotropic polymer, e.g., a wholly aromatic polyester or a wholly aromatic polyesteramide are produced by (a) extruding a melt of such thermotropic polymer through an extrusion apparatus including a downstream die member to provide at least one solid cylindrical profile thereof, during which extrusion (i) the molten thermotropic polymer is at a temperature $T_1$ greater than the melting temperature $T_M$ thereof at which the liquid crystal phase develops, while (ii) cooling such molten thermotropic polymer no later than the instant of its inlet entry into the die member to a temperature $T_2$ ranging from a value 7° C. less than the temperature $T_M$ to a minimum value equal to the crystallization temperature $T_c$ thereof, and (iii) maintaining this temperature $T_2$ of the molten thermo-tropic polymer during extrusion thereof through the die member, and then (b) granulating and grinding the at least one solid cylindrical profile thus provided.

7 Claims, No Drawings

PROCESS FOR THE PRODUCTION OF FINELY DIVIDED AND FREE-FLOWING POWDERS OF THERMOTROPIC POLYMERS

BACKGROUND OF THE INVENTION

1. Field of the Invention

The present invention relates to the production of finely divided and free-flowing powders from thermotropic polymers which are capable of forming anisotropic melts, and, more especially, to the production of such powders by grinding granulates of thermotropic polymers via an extrusion/granulation technique characterized by unique parameters of the extrusion operation.

The present invention also relates to the granulates that serve as intermediates in the above technique and which are converted into the final product powders when ground.

This invention also relates to such finely divided and free-flowing powders, per se.

2. Description of the Prior Art

For about the last ten years, there has been an increasing interest in polymers which are capable of forming anisotropic melts, and also in polymers which are capable of forming liquid crystal phases (or organized mesophase) in the melt.

These polymers have different phase transition temperatures which are, in an increasing order of temperatures:

(a) the crystallization temperature on cooling ($T_c$);

(b) the melting temperature ($T_M$) at which the liquid crystal phase appears; and (c) the clearing temperature ($T_{cl}$) beyond which the mesophase becomes isotropic.

These temperatures $T_c$, $T_M$ and $T_{cl}$ are determined by differential calorimetric analysis (DSC), using a Du Pont apparatus comprising a DSC 910 module coupled with a 9900 central processing unit, on samples subjected to both increasing and decreasing temperature changes of 20° C./minute. The crystallization and melting temperatures correspond to the peaks of the crystallization exotherm on cooling and of the melting endotherm. The nature of the phases which are present is identified by observations using a polarizing microscope equipped with a heated stage. The temperature span of the anisotropy range, an interval which can be represented by the difference $T_{cl}-T_M$ and which has a value ranging from about ten degrees to several tens of degrees will depend essentially on the structure of the thermotropic polymer.

The above increasing interest in the thermotropic polymers is related to the fact that, in the melt, these polymers spontaneously have a specific orientation and a relatively high degree of organization. This orientation and organization are also present in the articles shaped from these polymers, which impart thereto improved physicochemical and mechanical properties which are not observed in shaped articles which are identical but isotropic. However, given this spontaneous orientation and organization of the material in the melt, the conversion of these thermotropic polymers by extrusion:

(i) when involving the manufacture of shaped articles other than filaments and fibers and consisting of profiles, such as, for example, rods, bars and tubes, (ii) such extrusion being conducted according to the usual operating technique known to this art for extruding nonthermotropic polymers, in which the temperature of the polymeric material which is selected, both within the cavity of the extruder and in the calibrating die, is situated at a value above the melting temperature of the polymer (in the case of a thermotropic polymer, this value is generally situated within the anisotropy range), results in shaped objects whose fine structure, even after cooling, is highly fibrillar due to the essentially uniaxial orientation of the polymer chains in the direction of flow of the material; as a result, such extruded shaped articles, which display transverse embrittlement leading to delamination phenomena, are not suitable for industrial applications.

When, for example, it is a rod that is recovered at the die outlet, it has been found that it is still impossible, or else very difficult, to obtain:

(i) when a granulation operation is carried out according to the conventional technique for granulating a rod of nonthermotropic polymer, compact granulates of nonfibrillar fine structure that are required for an effective downstream grinding operation;

(ii) when these granules are ground according to conventional technique for grinding granulates based on nonthermotropic polymer, finely divided and free-flowing powders which are suited for such applications as, for example, electrostatic or fluidized-bed coating, or the production of thermoplastic composites by compression molding. The powders based on thermotropic polymer which are produced are particles which are not spherical but are acicular in shape and these powders form a wad (or entanglement) of microfibrils which is not free-flowing, or a mass of fibers of very different sizes which is also not free-flowing.

SUMMARY OF THE INVENTION

Accordingly, a major object of the present invention is the provision of a novel process for the production of finely divided and free-flowing powders from thermotropic polymers via a sequence of conventional extrusion, granulation and grinding operations employing conventional apparatus for the conversion of nonthermotropic polymers, but by selecting critical temperature conditions when carrying out the extrusion parameter.

Another object of the present invention is the provision of novel compact granulates of thermotropic polymer, the fine structure of which is nonfibrillar.

Yet another object of this invention is the provision of novel finely divided and free-flowing powders of thermotropic polymers which comprise spherical particles.

Briefly, the present invention features a process for the production of finely divided and free-flowing powders from thermotropic polymers which are capable of forming anisotropic melts, comprising the following operations:

(a) an extrusion stage which comprises converting a polymeric material into the molten state in an extruder, and extruding the molten polymer through a die orifice without a mandrel of an appropriate shape to provide one or more solid cylindrical profiles or shaped articles, and (b) then conventionally granulating and grinding the profiles thus produced using conventional apparatus to produce the desired powders, (c) with the proviso that, during the extrusion stage:

(i) the molten thermotropic polymer is at a temperature $T_1$ greater than the melting temperature $T_M$ at which the liquid crystal phase appears, (ii) the melt is cooled prior to entry into the die such as to attain, at latest at the instant of entry into the die, a temperature $T_2$ ranging from 7° C. less than the temperature $T_M$ to a minimum value which is equal to the crystallization temperature $T_c$, and (iii) maintaining such temperature $T_2$ during extrusion of the polymer through the die and, optionally, until the polymer shaped article is transferred into the granulation apparatus.

DETAILED DESCRIPTION OF THE PREFERRED EMBODIMENTS OF THE INVENTION

More particularly according to the present invention, by "solid cylindrical profile" or "shaped article" are intended both optionally linear rods of uniform section of various shapes and optionally linear bars of uniform section of various shapes. In a preferred embodiment of the invention, linear rods are produced having a circular uniform cross-section and diameter ranging, for example, from 2 to 6 mm.

It should be appreciated that the profiles produced can be conveniently stored in the open air before conversion thereof in subsequent granulation and grinding operations.

By the expression "extruder" is intended an apparatus in which no dead zone exists when the polymer is advancing therethrough. Apparatus of this type is well known to this art and can comprise one or more screws. In a preferred embodiment of the invention, an extruder is used whose size and kneading screws are designed as not to initiate self-heating of the polymeric material that is being processed. Examples of such apparatus are the single-screw extruders marketed under the trademarks "Brabender", "Prodex", "Samafor" and "Thoret", and the twin-screw extruders marketed under the trademarks "Buss", "ZSK" and "Leistritz".

The thermotropic polymers capable of forming anisotropic melts which are suitable for processing according to the present invention include the wholly aromatic polyesters, alkylaromatic polyesters, wholly aromatic polyesteramides, alkylaromatic polyesteramides, aromatic polyazomethines, aromatic carbonate polyesters and mixtures of such polymers.

In a preferred embodiment of the present invention, the thermotropic polymers processed are wholly aromatic polyesters, wholly aromatic polyesteramides and mixtures of such polymers.

Representative such thermotropic wholly aromatic polyesters are described, for example, in U.S. Pat. Nos. 991,013, 3,991,014, 4,066,620, 4,075,262, 4,118,372, 4,130,545, 4,161,470, 4,181,792, 4,188,476, 4,219,461, 4,224,433, 4,230,817 and 4,346,208; in published European Patent Application EP-A-0,191,705, and in published French Patent Application FR-A-2,617,851, hereby expressly incorporated by reference.

Representative such thermotropic wholly aromatic polyesteramides are described, for example, in U.S. Pat. Nos. 4,272,625, 4,330,457, 4,339,375 and 4,355,132, in published European Patent Application EP-A-0,272,992 and in published French Patent Applications FR-A-2,617,851, 2,617,852 and 2,617,853, also hereby expressly incorporated by reference.

The thermotropic polymers which are advantageously used are those belonging to the above general or preferred classes, which have a melting temperature ranging from 200° C. to 370° C. and, preferably, from 260° C. to 350° C. and which exhibit an inherent viscosity of at least 0.5 dl g$^{-1}$, preferably ranging from 1.0 to 4.0 dl g$^{-1}$. As regards the inherent viscosity, this is measured at 25° C. on a solution containing 0.5 g of polymer per 100 cm$^3$ of solvent(s) such as, for example, a mixture of para-chlorophenol and 1,2-dichloroethane (50/50 by volume).

Thermotropic wholly aromatic polyesters and polyesteramides which are very especially preferred are those described in published European Patent Applications EP-A-0,191,705 and 0,272,992. These polyesters and polyesteramides comprise recurring structural units of the formulae (I), (II), (III) and (IV), with the recurring units (II) being optional, and wherein:

(I) represents the structure: 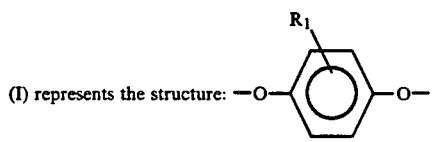

in which R$_1$ is a methyl or ethyl radical or a chlorine or bromine atom, and wherein the recurring units (I) may be identical or different;

(II) represents the structure:

(III) represents the structure:

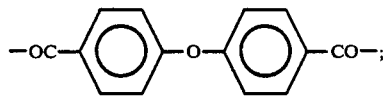

(IV) represents the structure:

in which the symbol A is an oxygen atom or the NH group;

the molar ratio of the recurring units (I) relative to the sum of the recurring units (II)+(III) ranges from 0.95 to 1.05;

the amount of the recurring units (II) in the mixture (II)+(III) ranges from 0% to 70 mol % and that of the recurring units (III), relative to the same mixture, ranges from 100 to 30 mol %; and the amount of the recurring units (IV) expressed relative to the amount of the recurring units (I) ranges, in the event that A=0, from 10% to 300 mol % and, in the event that A=NH, from 5% to 100 mol %.

In an especially preferred embodiment of the invention, the thermotropic wholly aromatic polyesters and polyesteramides have a structure such as that described above, in which:

the amount of the recurring units (II) in the mixture (II)+(III) ranges from 20% to 60 mol % and that of the recurring units (III), relative to the same mixture, ranges from 80% to 40 mol %; and the amount of the recurring units (IV), expressed relative to the amount of the recurring units (I), ranges, in the event that A=0, from 30% to 200 mol % and, in the event that A=NH, from 10% to 60 mol %. Among such especially preferred aromatic polyesters and polyesteramides, particularly representative are the polymers exhibiting a structure in which the recurring units (I) are identical, with the substituent $R_1$ being a methyl radical or a chlorine atom.

The very especially preferred thermotropic wholly aromatic polyesters and polyesteramides include the polymers which may additionally contain in their structure aromatic recurring units providing ester and amide functional groups (dioxy units and/or dicarbonyl units and/or mixed oxy/carbonyl or secondary-amino/carbonyl units) which have a structure other than that of the recurring units (I), (II), (III) and (IV), the total amount of these additional units not exceeding 10 mol % relative to the amount of the recurring units (I). Exemplary such additional units include those of the formulae:

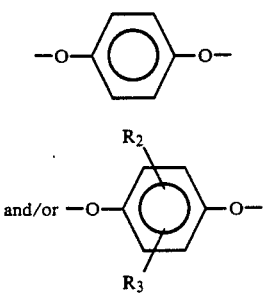

(I')

(I")

wherein each of $R_2$ and $R_3$, which may be identical or different, has the definition given above for $R_1$, with the proviso that the recurring units (I") may be identical or different,

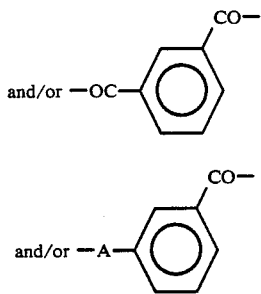

(II')

(IV')

wherein the symbol A is as defined in connection with the units (IV).

Another class of thermotropic wholly aromatic polyesters and polyesteramides which is also very especially preferred includes the polymers described in U.S. Pat. Nos. 4,161,470 and 4,330,457, which have the following special features.

These polyesters comprise recurring structural units of the formulae (V) and (VI):

(V) representing the structure:

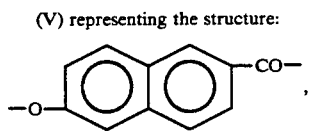

(VI) representing the structure:

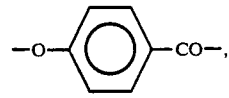

and wherein the amount of the recurring units (V) in the mixture (V)+(VI) ranges from 10% to 90 mol % and that of the recurring units (VI), relative to the same mixture, ranges from 90% to 10 mol %.

These polyesteramides comprise recurring structural units of the formulae (VII), (VIII) and (IX):

(VII) representing the structure:

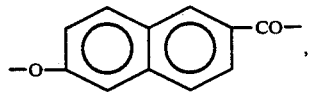

(VIII) representing the structure: 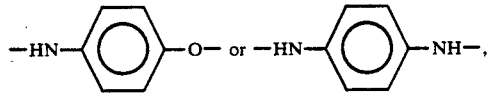

(IX) representing the structure:

—HN—⟨◯⟩—O— or —HN—⟨◯⟩—NH—, and wherein the amount of the recurring units (VII) in the mixture (VII)+(VIII)+(IX) ranges from 10% to 90 mol %, that of the recurring units (VIII), relative to the same mixture, ranges from 5% to 45 mol % and that of the recurring units (IX), relative to the same mixture, ranges from 5% to 45 mol %.

Among the wholly aromatic polyesters and polyesteramides of this other class of very especially preferred polymers, those which are suitable are the polymers marketed by Celanese under the trademark Vectra, of A 900 (polyester) or B 900 (polyesteramide) type.

As indicated above, an essential condition for carrying out the process of this invention entails establishing particular and critical temperature conditions in the extruder.

The temperature $T_1$ is selected such as to avoid any phase heterogeneity in the melt. This temperature is a function of the rate and duration of shearing, but it is at least 5° C. higher than the melting temperature $T_M$ at which the liquid crystal phase appears. The difference between $T_1$ and $T_M$ is proportionately greater the greater the crystallizability of the polymer and the higher the extrusion rates. The thermotropic polymer is preferably melted at a temperature $T_1$ ranging from a value 5° C. greater than $T_M$ to the clearing temperature $T_{cl}$, care being taken, however, not to exceed a value equal to $T_M+50°$ C. in the case of $T_1$. The difference $T_{cl}-T_M$ can vary according to the type of polymer, and can typically attain a value of 20° to 60° C.

The cooling of the melt to the temperature $T_2$ is performed homogeneously, namely, not only the surface layers but also the entirety of the stream in the fluid state must be adjusted to the selected cooling temperature not later than the instant of entering the die. The cooling conditions and the extrusion rate must, furthermore, be controlled such as to avoid self-heating of the polymeric material. In particular, the temperature of the molten extrudate must not be lowered to a temperature below the crystallization temperature $T_c$. It is essential that the cooling take place prior to entry into the die, such that the entire mass of the stream in the fluid state be at the selected temperature $T_2$ when said stream is extruded through the die. The temperature $T_2$ is preferably selected such that it ranges from a value which is 7° C. less than the temperature $T_M$ to a value which is 10° C. greater than the crystallization temperature $T_c$. The difference $T_M - T_c$ can vary and can range from 20° to 40° C. Still more preferably, the temperature $T_2$ is selected such that it ranges from a value which is 7° C. less than the temperature $T_M$ to a value which is 15° C. greater than the temperature $T_c$.

In the event where the extent of cooling is not very great, for example on the order of a few degrees to about thirty degrees, the cooling can be carried out by adapting the flow rate of the material to be extruded. It is also possible to use an extruder fitted with a screw of great length, in which the molten material cools as it advances forward towards the distal end of the screw.

In another embodiment of the invention, the cooling to the desired temperature is carried out prior to extrusion through the die using a cooler/homogenizer device inserted between the end of the extruder barrel and the calibrating die. A simple type of device which can be used is present in static or dynamic mixers which offer the advantage of permitting an efficient and homogeneous heat exchange without a large pressure drop and of being adaptable, by a suitable selection of the number, of the geometry and of the temperature of the components, to the intensity of the cooling to be produced. Such device is described, for example, in French Patent FR-A-2,373,385.

As regards the solid cylindrical profiles which are obtained at the die outlet, each such profile is characterized in that it exhibits a nonfibrillar isotropic fine structure (which may be weakly anisotropic). To the said isotropic state (which may be weakly anisotropic), there corresponds a degree of crystalline orientation fc which is equal to or lower than 0.3; this measurement of the degree of crystalline orientation fc is carried out by X-ray diffraction using a Philips PW 1130/1300 apparatus according to the method described in *Principles of Polymer Processing* by Z. Tadmor and C.G. Gogos, published by J. Wiley and Sons in 1979, pages 77 to 80. It will be appreciated that a crystallinity fc equal to 1 corresponds to a fine structure which is completely anisotropic (or perfectly oriented structure), while a crystallinity fc equal to zero corresponds to a fine structure which is completely isotropic (or perfectly disoriented structure).

At the die exit, the profiles obtained are generally already defined in one or two dimensions and ready to be cut into the form of granules of suitable dimensions of cylindrical or even cubic shapes.

In the event that the profiles exiting the die are hard products, they can be cut directly upon leaving the extruder with, for example, rotary cutters which are flush with the die, with an air purge cooling the granulates and preventing the granules from sticking together. In the event that the profiles exiting the die are soft products, they are cooled, for example by passing same through a water trough fitted between the extruder and the granulator. The granulators generally are in the shape of simple grinders with grids, or are fitted with blades cut into a comb shape; their speed must not be too high, to avoid heating the material and setting it solid.

The product of this granulation operation comprises compact granules. When, for example, it is a linear rod which has a circular uniform cross-section and a diameter ranging from 2 to 6 mm, which is extruded, then compact granules which have dimensions, for example, ranging from 2 mm to 6 mm in one direction and from 2 mm to 12 mm in the other direction are obtained by granulation.

The present invention also features such granulates as a product, per se, i.e., independently of the process for the production thereof.

These compact granules of thermotropic polymer are characterized in that each exhibits a nonfibrillar fine structure which is also isotropic (which may be weakly anisotropic). Here too, to said isotropic state (which may be weakly anisotropic) of their structure, there corresponds a degree of crystalline orientation which is equal to or less than 0.3.

These granulates enable the subsequent grinding operation to be carried out satisfactorily under completely conventional conditions. The product of the grinding is a finely divided and free-flowing powder whose particle dimensions will depend, in a manner known per se, for example on the selection of the type of mill, on the operating speed, on the milling time and on the number of passes through the mill.

The present invention also features such powders, per se.

These fine and free-flowing powders of thermotropic polymer are characterized in that, on the one hand, they are spherically shaped particles and, on the other hand, here too, each of said particles exhibits a nonfibrillar isotropic fine structure (which can also be weakly anisotropic). To said isotropic state (which can also be weakly anisotropic) of the structure of these particles, there corresponds a degree of crystalline orientation which is always equal to or less than 0.3.

At the end of the process of this invention, finely divided and free-flowing powders are produced having particle diameters as low as those ranging from 5 to 30 μm. Such particle diameters ranging from 5 to 30 μm require that the final grinding operation be carried out in apparatus which preferably functions by percussion, such as, for example, mills with rigid rotary impinging masses on a vertical axis or on horizontal axis, articulated hammer mills, mills with pins, pegs or crossbars, free-fall mills, nozzle mills or jet mills (optionally with a fluidized bed) employing a fluid (especially air) under pressure as a force-transmitting element; a grinding technique which is very particularly preferred entails combining a grinding operation in an apparatus of the aforementioned type with a complementary operation in another apparatus of the aforementioned type. In this respect, particularly representative is the combination of a pin mill with a downstream fluidized bed air-jet mill.

In order to further illustrate the present invention and the advantages thereof, the following specific example and comparative examples are given, it being understood that same are intended only as illustrative and in nowise limitative.

EXAMPLE AND COMPARATIVE EXAMPLES

1. Description of the thermotropic polymer employed

An aromatic copolyester as described in European Patent Application EP-A-0,191,705 was prepared.

The following reactants were introduced into a 300-liter polycondensation reactor, stirred and heated by a heat transfer fluid circulating through the reactor jacket, fitted with a device for distillation and for purging with an inert gas:

| (1) methylhydroquinone diacetate molar ratio (1)/(2) + (3) = 1; | 67.10 kg |
|---|---|
| (2) terephthalic acid 50 mol % in the mixture (2) + (3); | 26.77 kg |
| (3) di-4-carboxyphenyl ether 50 mol % in the mixture (2) + (3); | 41.61 kg |
| (4) para-acetoxybenzoic acid 60 mol % relative to (1). | 34.84 kg |

The reactor was purged with nitrogen and was then heated with the heat transfer fluid controlled at 260° C. for 2 hours; this temperature was then increased to 300° C. for 20 minutes. The amount of distilled acetic acid was 42.82 kg (i.e., 85% of theory). The temperature of the heat transfer fluid was then increased gradually to 310° C. over 60 minutes, while at the same time the pressure was reduced from $1,010 \times 10^2$ Pa to $2.66 \times 10^2$ Pa. The temperature of 310° C. and the pressure of $2.66 \times 10^2$ were maintained for another 10 minutes; the amount of acetic acid collected during this stage was 7.55 kg (i.e., 100% of theory, in total).

Stirring was then stopped and a nitrogen pressure was established in the reactor and the polymer was drawn from the bottom at 310° C. through a circular valve 8 mm in diameter. The polymer obtained was recovered in the form of a greyish rod with a more or less circular nonuniform section which had a fibrillar structure; this rod was cooled by immersion over a length of 2 meters in water maintained at 17° C. and was then chopped into non-compact granules (they had a fibrillar fine structure) of heterogeneous shape and dimensions, using a granulator marketed under the trademark "Automatic".

The polymer obtained had an inherent viscosity of 1.93 dl g$^{-1}$ (solvents: para-chlorophenol/1,2-dichloroethane, 50/50 by volume). The crystallization temperature $T_c$ was equal to 267° C. The melting temperature $T_M$ at which the liquid crystal phase appeared was equal to 300° C. The clearing temperature $_{cl}$, above which the mesophase became isotropic, was higher than 350° C.

2. Preparation of the compact granulates in accordance with the invention

The thermotropic polymer was extruded in a twin corotative screw extruder marketed under the trademark "Leistritz", containing screws, each of which had a diameter D equal to 34 mm and a length equal to 35 D.

This extruder was equipped with 10 barrel heating zones and with a die equipped with circular hole 4 mm in diameter.

The temperature profile of the material extruded along the barrel was equilibrated, under steady operating conditions, as given below:

(a) extruder first section where the melting was carried out: this corresponded to zones 1 to 4 where the temperature reached 320° C. (temperature $T_1$);

second section where the cooling was carried out: this corresponded to zones 5 to 9, where the temperature changed gradually from 320° C. to 290° C.;

then to zone 10, where the temperature was stabilized at 290° C. (temperature $T_2$);

(b) die
290° C.

The speed of rotation of the screws was fixed at 100 revolutions/minute and the material flow rate was on the order of 10 kg/hour.

At the die exit, the rod obtained, which had a circular uniform section with a diameter of 4 mm was cooled by passage in air for 5 meters and was then chopped into compact granules, each of which had a diameter of 4 mm and a length on the order of 5 mm, using a Coste-Chevaleyre, type CJ-15-F rotary cutter granulator.

3. Preparation of finely divided and free-flowing powder according to the invention The final grinding operation was carried out by associating the following two stages into a sequence:

(i) a first stage, in which the compact granules obtained were subjected to pregrinding, the operation being carried out in a pin percussion mill marketed under the trademark "Alpine, type 160 Z"; the (linear) speed of rotation of this apparatus was 1.75 m/second and the powder flow rate was on the order of 30 kg/hour;

(ii) a second stage, in which the powder originating from the preceding pregrinding was then transferred to a fluidized-bed air-jet mill marketed under the trademark "Alpine, type AFG 200"; the grinding was carried out using an air pressure of $6 \times 10^5$ Pa, with a classifier speed of 9,000 revolutions/minute and a product feed rate of 40 kg/hour.

4. Comparative Examples A to C

For purposes of comparison, the same operations as those described above under the headings k1 to 3 were reproduced, but with a modified temperature profile of the extruded material when performing the extrusion.

More particularly:

in Comparative Example A: the thermotropic polymer melted at the temperature $T_1$ was not subjected to any cooling upon entry into the die (the temperature $T_2$ then remained equal to $T_1$);

in Comparative Example B: the temperature of the thermotropic polymer was adjusted to a temperature $T_1$, which was not higher than the melting temperature $T_M$;

in Comparative Example C: the thermotropic polymer was heated to the adequate temperature $T_1$, but insufficient cooling was applied, with the result that the temperature $T_2$ was not reduced to a value which was at least 7° C. lower than the temperature $T_M$.

5. Checks and measurements performed

In each of the examples and comparative examples carried out, the following checks and measurements were performed, both on the extruded rod and on the granulates and the powder:

(a) visual and microscopic observations of the fine structure: this was fibrillar (=F) or nonfibrillar (=NF);

(b) measurement of the degree of crystalline orientation fc.

Insofar as the powder was concerned, the following were additionally examined:

(c) the shape of the constituent particles: this shape was spherical (=S) or acicular (=A); and (d) its particle size range, using a laser diffraction particle size analyzer marketed under the trademark "Malvern"; the range in μm in which the particle diameters (=d) were situated will be given, with an indication concerning their average length (=1 ave) in the case of the acicular particles.

The results of the checks and measurements carried out are reported in the following Table:

TABLE

| EXAMPLE/ COMPARATIVE EXAMPLE | EXTRUSION TEMPERATURE | | | ROD, GRANULES AND POWDERS | | POWDER | |
|---|---|---|---|---|---|---|---|
| | T1 | T2 | Die | Structure | Degree of orientation | Particle form | Particle size range |
| 1 | 320° C. | 290° C. | 290° C. | NF | 0.28 | S | 10-20 μm |
| A | 310° C. | 310° C. | 310° C. | F | 0.95 | A | 500-800 μm, 1 ave ~ 3d |
| B | 280° C. | 280° C. | 280° C. | F | 0.70 | A | 500-800 μm, 1 ave ~ 3d |
| C | 320° C. | 295° C. | 295° C. | F | 0.40 | A | 300-600 μm, 1 ave ~ 2d |

While the invention has been described in terms of various preferred embodiments, the skilled artisan will appreciate that various modifications, substitutions, omissions, and changes may be made without departing from the spirit thereof. Accordingly, it is intended that the scope of the present invention is limited solely by the scope of the following claims, including equivalents thereof.

What is claimed is:

1. A process for the production of a finely divided and free-flowing powder of a thermotropic polymer that can form an anisotropic melt thereof, comprising (a) extruding a melt of said thermotropic polymer through an extrusion apparatus including a downstream die member to provide at least one solid cylindrical profile thereof, during extrusion (i) said molten thermotropic polymer is maintained at a temperature $T_1$ greater than a melting temperature $T_M$ thereof at which a liquid crystal phase develops, followed by (ii) homogeneously cooling said molten thermotropic polymer no later than the instant of its inlet entry into said die member to a temperature $T_2$ ranging from a maximum value 7° C. less than the temperature $T_M$ to a minimum value equal to a crystallization temperature $T_C$ thereof, and (iii) maintaining said temperature $T_2$ of said molten thermotropic polymer during extrusion thereof through said die member, and then (b) at least one of granulating and grinding the at least one solid cylindrical profile thus provided.

2. The process as defined by claim 1, comprising maintaining said temperature $T_2$ until the step of granulating the at least one solid cylindrical profile thus provided.

3. The process as defined by claim 1, said thermotropic polymer selected from the group consisting of a wholly aromatic polyester, an alkylaromatic polyester, a wholly aromatic polyesteramide, an alkylaromatic polyesteramide, an aromatic polyazomethine, an aromatic carbonate polyester, or mixture thereof.

4. The process as defined by claim 3 said thermotropic polymer selected from the group consisting of a wholly aromatic polyester, a wholly aromatic polyesteramide, or mixture thereof.

5. The process as defined by claim 1, said thermotropic polymer having a melting temperature ranging from 260° C. to 350° C. and an inherent viscosity ranging from 1 to 4 dl g$^{-1}$.

6. The process as defined by claim 1, said temperature $T_1$ ranging from a value 5° C. greater than the temperature $T_M$ to a clearing temperature $T_{cl}$ of the molten polymer, wherein $T_1$ does not exceed the temperature $T_M + 50°$ C.

7. The process as defined by claim 6, comprising cooling said molten thermotropic polymer no later than the instant of its inlet entry into said die member to a temperature $T_2$ ranging from a value 7° C. less than the temperature $T_M$ to a value 10° C. greater than the crystallization temperature $T_c$.

* * * * *